May 18, 1937.  A. M. STONER  2,080,840
CHUCK
Filed April 27, 1936
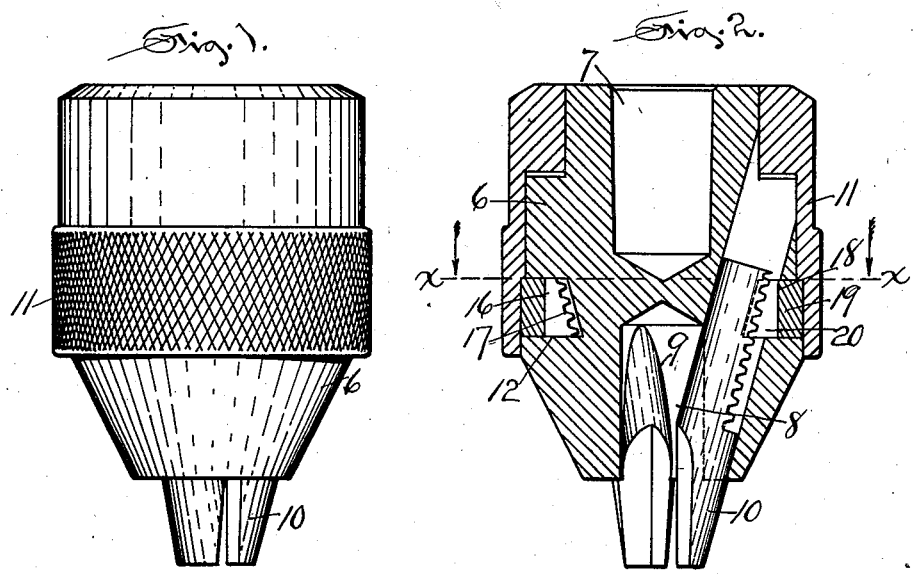
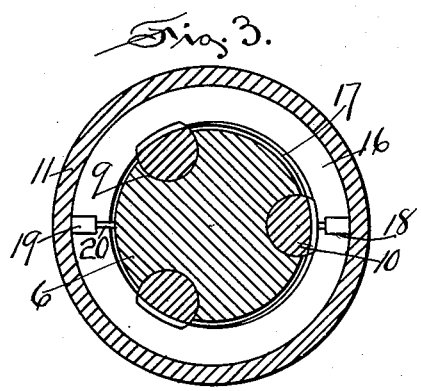
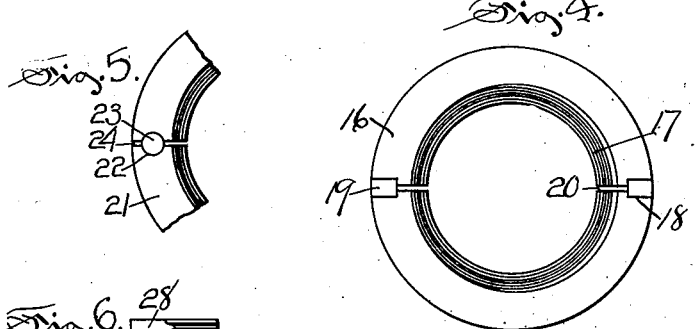
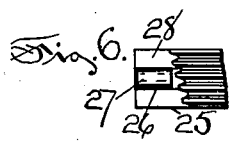
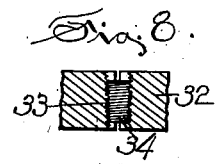
INVENTOR
Arthur M. Stoner,
by
Arthur B. Jenkins,
ATTORNEY Patented May 18, 1937

2,080,840

UNITED STATES PATENT OFFICE 2,080,840

CHUCK

Arthur M. Stoner, West Hartford, Conn., assignor to The Jacobs Manufacturing Company, Hartford, Conn., a corporation of Connecticut Application April 27, 1936, Serial No. 76,510

1 Claim. (Cl. 279—62)

My invention relates more particularly to that class of devices known as drill chucks in which the jaws are moved for clamping and unclamping action by means of a sleeve mounted on the chuck body and having a ring threaded to fit the threads on the chuck jaws, and an object of my invention, among others, is to provide a ring that shall have a marked degree of skilled workmanship and that shall be extremely accurate in form, together with means for producing it.

One form of a chuck having a ring embodying my invention and in the construction and use of which the objects herein set out, as well as others, may be attained is illustrated in the accompanying drawing in which Figure 1 is a side view of a chuck embodying my invention.

Figure 2 is a view in lengthwise central section through the same.

Figure 3 is a view in cross section on a plane denoted by the dotted line x—x of Fig. 2.

Figure 4 is a similar view showing my improved ring.

Figure 5 is a view of a fragment of a ring showing a little different construction.

Figure 6 is a similar view showing still another form of the block.

Figure 7 is a similar view illustrating another modification.

Figure 8 is another similar view illustrating still another modification.

A common form of drill chuck in use at the present time comprises in its structure a chuck body having a plurality of jaws that are movable longitudinally in said body by means of an actuating ring which is threaded on its inner surface to engage threads on the chuck jaws, this ring being secured to a sleeve rotatably mounted on the body, such a chuck being shown in the drawings herein in which the numeral 6 denotes the chuck body which is preferably tapered at its lower end and has a tapered recess 7 at one end to receive the tapered end of a drill spindle and also has a recess 8 at its opposite end out of which bores 9 open for the reception of chuck jaws 10 of any suitable number, three being commonly employed. A sleeve 11 is formed to fit the body upon which it is rotatably mounted, this sleeve having a ring which is threaded on its inner surface to engage the threaded outer surface of the chuck jaws 10, and it is with the construction of this ring that my invention has primarily to do.

It is essential that this ring shall be accurately round so near as it can be made. It is set into an annular groove 12 in the chuck body and this necessitates that it shall be made in sections, two sections being commonly employed.

In prior structures it has been common practice to form a ring from soft material that can be readily threaded. After the threading operation notches are cut in diametrically opposite sides of the ring for the purpose of localizing a line of separation, and the ring is then subjected to heat treatment to change it to a hard brittle structure that may be broken. Such a ring of old construction has notches cut into diametrically opposite sides thereof and the ring is then broken into two sections. This is a crude way, so to speak, of producing this sectional ring but it is the best that has heretofore been devised for providing a sectional ring having a circular form, as it will be seen that if the ring be cut, as by sawing, entirely through opposite sides the circular form would be decreased to the extent of the metal removed by the sawing or cutting operation. In breaking the old form of ring the threads are distorted affecting the accuracy of the chuck, and the distorted surfaces at the break crumble away in use, resulting in premature wear on the ring, and interference with the smooth operation of the chuck. In the old form of ring, too, a very brittle material had to be used, so that the break could be made with a minimum degree of distortion. This material was not best adapted for forming the ring because of the inherently low strength and high coefficient of friction characteristic of such brittle material.

In adapting my invention I produce my improved ring 16 as shown in Figure 4 which is cut to substantially truly circular form. Threads 17 are then cut on the inner surface of the ring to fit the threads upon the chuck jaws 10. Recesses 18 are then cut into diametrically opposite sides of the ring, preferably on the outside thereof. Blocks or fillers 19 are then formed to accurately fit the recesses 18, the latter being of such shape as may be desired, a rectangular shape being shown in Figs. 2, 3, and 4. The ring is now ready for the final operation which consists in sawing slits 20 through it on diametrically opposite sides thereof, said slits opening into the recesses 18.

It will now be seen that the metal that has been removed by the sawing will not reduce the circular shape of the ring for the reason that the blocks or fillers 19 preserve such circular form and will maintain such form indefinitely as there are no jagged edges or other elements which will cause it to become deformed in use, and the ring may be formed from a material not requiring heat treatment after the threads are produced, so that no distortion takes place and a true circular form is retained when the ring is assembled in the chuck.

I contemplate as within the spirit and intent of my invention blocks of various shapes and which may be embodied in the ring structure in different ways, some of which are herein illustrated. As an example, as shown in Fig. 5, the ring has holes 22 bored through it in the direction of depth, pins 23 of cylindrical shape are made to fit the holes, and the ring is then separated into sections as by cutting the slits 24 therein. In that form of the structure shown in Fig. 6 the ring 25 is formed on its diametrically opposite sides with holes 26 into which fillers or pins 27 are fitted, the ring then being cut as before as shown at 28.

In that form of the device shown in Fig. 7 the ring 29 has a tapered opening 30 extending in the direction of its depth, a tapered wedge or block 31 is fitted to said opening, and the ring is then cut through as at 32. In this form of the device, in finally setting the wedge or block in place an instrument may be employed to denote when the sections of the ring are properly positioned to form a true circle, the wedge being gradually inserted until this form is obtained.

In that form of the structure shown in Fig. 8 the ring 32ª is formed in a similar manner to that shown in Fig. 7 with the exception that the hole 33 is threaded to receive a threaded block or pin 34.

In accordance with the provisions of the patent statutes I have described the principles of operation of my invention together with the device which I now consider to represent the best embodiment thereof; but I desire to have it understood that the device shown is only illustrative and that the invention may be carried out by other means and applied to uses other than those above set out.

I claim:

In an internally threaded actuating ring for a chuck, wherein the ring is formed of sections to facilitate assembly in a chuck body, and wherein material of the ring is removed by sawing or a like operation to form the ring in sections, means to preserve the true circular form of the ring comprising diametrically opposite recesses in the body of the ring intercepting the line of saw cuts, and spacing blocks in said recesses for holding the ends of the ring sections spaced apart a distance exactly equal to the width of the material removed by the saw cuts thereby assuring the location of the threads of the ring sections in a true spiral.

ARTHUR M. STONER.